US012754810B2

(12) United States Patent
Biasci et al.

(10) Patent No.: US 12,754,810 B2
(45) Date of Patent: Oct. 6, 2026

(54) HYPERVISOR DEVICE AND METHOD FOR FAILURE MITIGATION OF A VIRTUAL MACHINE

(71) Applicant: HUAWEI TECHNOLOGIES CO., LTD., Shenzhen (CN)

(72) Inventors: Alessandro Biasci, Pisa (IT); Fabrizio Tronci, Munich (DE); Ida Maria Savino, Pisa (IT); Bruno Morelli, Pisa (IT); Luca Cuomo, Pisa (IT)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/963,131

(22) Filed: Nov. 27, 2024

(65) Prior Publication Data

US 2025/0086071 A1 Mar. 13, 2025

Related U.S. Application Data

(63) Continuation of application No. PCT/EP2022/064546, filed on May 30, 2022.

(51) Int. Cl.
*G06F 11/1482* (2026.01)
*G06F 11/07* (2006.01)

(52) U.S. Cl.
CPC ...... *G06F 11/1484* (2013.01); *G06F 11/0793* (2013.01)

(58) Field of Classification Search
CPC ......................... G06F 11/1484; G06F 11/0793
See application file for complete search history.

(56) References Cited

U.S. PATENT DOCUMENTS

| | | | |
|---|---|---|---|
| 5,859,963 | A | 1/1999 | O'Dowd et al. |
| 7,653,899 | B1 | 1/2010 | Lindahl et al. |
| 8,015,552 | B1 | 9/2011 | Lindahl et al. |
| 8,132,159 | B1 | 3/2012 | Lindahl et al. |
| 8,136,096 | B1 | 3/2012 | Lindahl et al. |
| 8,266,608 | B2 | 9/2012 | Hecht et al. |
| 8,271,955 | B1 | 9/2012 | Lindahl et al. |
| 8,584,097 | B2 | 11/2013 | Lindahl et al. |
| 8,789,023 | B2 | 7/2014 | Lindahl et al. |
| 8,914,777 | B2 | 12/2014 | Lindahl et al. |
| 9,342,437 | B2 | 5/2016 | Lindahl et al. |

(Continued)

OTHER PUBLICATIONS

Freitag et al., "Virtual Timing Isolation for Mixed-Criticality Systems," Leibniz International Proceedings in Informatics, Total 23 pages (Jun. 22, 2018).

(Continued)

*Primary Examiner* — Bryce P Bonzo
*Assistant Examiner* — Audrey Emma Whitesell
(74) *Attorney, Agent, or Firm* — Leydig, Voit & Mayer, Ltd.

(57) ABSTRACT

A hypervisor device mitigates failure of a virtual machine (VM) by masking an interrupt request (IRQ) of another VM of lower priority. A hypervisor device for failure mitigation of a VM is configured to: operate a first VM; operate a second VM, where the first VM has a higher priority level than the second VM; determine an interference parameter indicating a magnitude of interference of the second VM on the first VM; and mask at least one IRQ relating to the second VM based on the interference parameter to mitigate a failure of the first VM.

14 Claims, 12 Drawing Sheets

1200

(56) References Cited

U.S. PATENT DOCUMENTS

| | | | | |
|---|---|---|---|---|
| 9,898,385 | B1 | 2/2018 | O'Dowd et al. | |
| 9,904,615 | B1 | 2/2018 | O'Dowd et al. | |
| 9,946,670 | B2 | 4/2018 | Klein et al. | |
| 10,248,595 | B2 * | 4/2019 | Hellwig | G06F 9/45558 |
| 10,310,883 | B2 * | 6/2019 | Maji | G06F 9/5083 |
| 2012/0297383 | A1 * | 11/2012 | Meisner | G06F 9/45558 718/1 |
| 2017/0262306 | A1 * | 9/2017 | Wang | G06F 9/5027 |
| 2019/0087223 | A1 | 3/2019 | Bhandari et al. | |
| 2019/0235943 | A1 | 8/2019 | Gordani et al. | |
| 2023/0376343 | A1 * | 11/2023 | Stoppa | G06F 9/4812 |

OTHER PUBLICATIONS

Crespo et al., "Hypervisor-based Multicore Feedback Control of Mixed-Criticality Systems," Digital Object Identifier 10.1109/ACCESS.2017.DOI, vol. 4, 2016, IEEE Access, DOI: 10.1109/ACCESS.2018.2869094, Total 15 pages (Sep. 2018).

Salardi et al., "Achieving Mixed Criticality and Category 3 Performance Level d (Cat. 3 PL = d) on single System on Chip," Intel, https://www.researchgate.net/publication/350374011, total 14 pages (Mar. 2021).

Chai et al., "A Short Review of Security-Aware Techniques in Real-Time Embedded Systems," World Scientific Publishing Company, DOI: 10.1142/S0218126619300022, Journal of Circuits, Systems, and Computers vol. 28, No. 2 (2019) 1930002, Total 23 pages (May 2018).

Cinque et al., "Virtualizing mixed-criticality systems: A survey on industrial trends and issues," Future Generation Computer Systems 129 (2022), URL: https://www.sciencedirect.com/science/article/pii/S0167739X21004787, Total 16 pages (Available online Dec. 2021).

Semiconductor Engineering, "Safety Islands In Safety-Critical Hardware," URL: https://semiengineering.com/safety-islands-in-safety-critical-hardware/, total 6 pages (Nov. 2019).

* cited by examiner

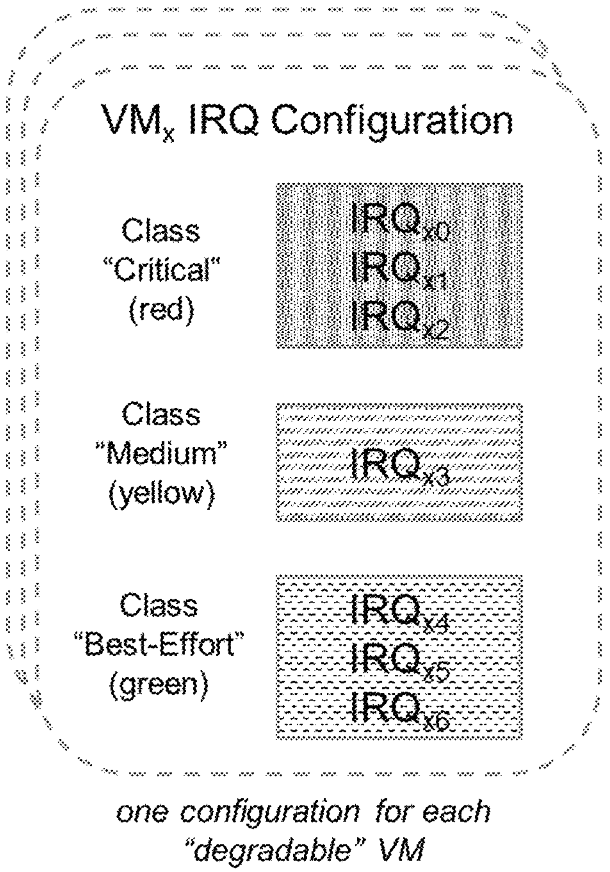

```
<VMx>
  <metrics>
    <mem-bandwidth = 100MB/s>
    <bus-bandwidth = 150MB/s>
  </metrics>

 <degraded state-0>
    </IRQ-on = "class critical, class medium,
                  class best-effort">
    </IRQ-off = "">
  </degraded state-0>
  <degraded state-1>
   </IRQ-on = "class critical, class medium">
   </IRQ-off = "class best-effort">
  </degraded state-1>
  <degraded state-2>
   </IRQ-on = "class critical">
   </IRQ-off = "class medium, class best-effort">
  </degraded state-2>
  <degraded state-3>
   </IRQ-on = "">
   </IRQ-off = "class critical, class medium,
class best-effort">
  </degraded state-3>
</VMx>
```

Fig. 8

HYPERVISOR DEVICE AND METHOD FOR FAILURE MITIGATION OF A VIRTUAL MACHINE

CROSS-REFERENCE TO RELATED APPLICATIONS

This application n is a continuation of International Application No. PCT/EP2022/064546, filed on May 30, 2022, the disclosure of which is hereby incorporated by reference in its entirety.

FIELD

The present disclosure relates to the field of virtualization and mixed-criticality systems or mixed critical systems (MCSs). A hypervisor device is provided in the present disclosure which can mitigate failure of a virtual machine (VM) by masking an interrupt request (IRQ) of another VM of lower priority. The present disclosure also provides a corresponding method and computer program.

BACKGROUND

In the field of virtualization, consolidation is a conventional technique aimed at aggregating software components (e.g., VMs) on top of a hardware platform (e.g., microcontrollers). In scenarios where the VMs have different safety integrity levels the aggregated system is known as an MCS.

An aspect of an MCS is the ability of providing Freedom From Interference (FFI) of each software component (e.g., each VM) from another. A drawback with conventional consolidation is that FFI is not always possible due to intrinsic hardware limitations or interference carried out by the design of such integrated software components. In those cases, there are no guarantees that safety requirements allocated on each software component will not be violated, e.g., because of cascading failures between two software components with a different integrity level.

Thus, software components interference, due to consolidation, is a well-known issue on virtualized systems. Conventional solutions in particular do not provide any mechanism that, in case of dependent failures, is able to guarantee the correct execution of safety-related features allocated on intermediate Automotive Safety Integrity Level (ASIL) VMs rather than quite generic solutions, such as the complete suspension of VMs or the scaling of Central Processing Unit (CPU) frequency.

As a result, there is the need for improved failure mitigation of VMs operated by a hypervisor.

SUMMARY

In view of the above-mentioned problem, embodiments of the present disclosure provide a hypervisor with improved mitigation of failures of VMs running on an MCS. The present disclosure describes selectively masking IRQs of a lower priority VM to mitigate a failure of a higher priority VM.

A first aspect of the present disclosure provides a hypervisor device for failure mitigation of a virtual machine (VM) where the hypervisor device is configured to: operate a first VM; operate a second VM, where the first VM has a higher priority level than the second VM; determine an interference parameter indicating a magnitude of interference of the second VM on the first VM; and mask at least one interrupt request (IRQ) relating to the second VM based on the interference parameter to mitigate a failure of the first VM.

This ensures that overall interference on a safety-critical VM in an MCS is mitigated and availability of intermediate-safety VMs is still high even if with a reduced quality-of-service (QoS).

In a possible implementation, masking an interrupt includes not handling an interrupt.

In a possible implementation, the at least one IRQ relating to the second VM can be masked without compromising the availability of the second VM.

In a possible implementation, both the first VM and the second VM are operated by a same hardware platform.

In a possible implementation, a failure of the first VM includes a value of at least one of exceeding a predefined threshold for: a CPU load, a Graphics Processing Unit (GPU) load, a memory load, a input/output (I/O) load, a cache-miss, network load, or a storage load.

In a possible implementation, the IRQ, which is to be masked in an IRQ of the second VM, is to a hardware platform which operates the first and the second VM.

In a possible implementation, the interference parameter includes an interference class (e.g., memory interference, I/O interference, etc.) and/or an interference magnitude (e.g., low, high, intermediate, etc.).

In a possible implementation, a hardware platform that operates VMs of different priority levels is a mixed critical system (MCS).

In an implementation form of the first aspect, the priority level includes a safety integrity level.

The present disclosure provides solutions in which the failure of safety critical VMs can be mitigated. For example, the safety integrity level includes an integrity level such as an automotive safety integrity level (ASIL).

In a further implementation form of the first aspect, the hypervisor device is further configured to determine the interference parameter based on a performance counter associated with the first VM and/or based on a performance counter associated with the second VM.

This is beneficial as it allows for detailed analysis of a load of a VM, e.g., to determine a failure of the respective VM in advance.

In a possible implementation, the performance counter is provided by the hardware platform which operates the respective VM.

In a further implementation form of the first aspect, the hypervisor device is further configured to obtain a first relationship indicating an influence of a performance counter type and/or a performance counter value on the magnitude of interference of the second VM with the first VM; and determine the interference parameter based on the first relationship.

This ensures that the interference parameter can be precisely calculated taking into account performance counter types and values.

In a possible implementation, the first relationship includes a first value and/or a first formula. In a possible implementation, the first relationship is obtained by the hypervisor device automatically, and/or by means of user input.

In a further implementation form of the first aspect, the hypervisor device is further configured to obtain a second relationship indicating the influence of an IRQ relating to the second VM on the magnitude of interference of the second VM with the first VM; and determine the interference parameter based on the second relationship.

This ensures that the interference parameter can be precisely calculated taking into account the influence of certain IRQs.

In a possible implementation, the second relationship includes a second value and/or a second formula. In a possible implementation, the second relationship is obtained by the hypervisor device automatically, and/or by means of user input.

In a further implementation form of the first aspect, the hypervisor device is further configured to obtain a first group of IRQs, and to select the at least one IRQ from the first group.

This allows for grouping IRQs, which may have a similar effect on failure mitigating and QoS, and to improve selecting of an IRQ which is suitable for a failure at hand.

In a further implementation form of the first aspect, the hypervisor device is further configured to obtain the first group of IRQs based on the second relationship.

This ensures that the first group can be determined more precisely.

In a further implementation form of the first aspect, the hypervisor device is further configured to obtain a second group of IRQs, and to further select the at least one IRQ from the second group if an attempt to mitigate the failure of the first VM based on masking an IRQ from the first group fails.

This ensures that several groups can be determined, each of which is ideal for a certain application scenario.

In a possible implementation, the hypervisor is further configured to select the at least one IRQ from the second group if an attempt to mitigate the failure of the first VM based on masking all IRQs from the first group fails.

In a further implementation form of the first aspect, the hypervisor device is further configured to obtain the second group of IRQs based on the second relationship.

This ensures that also the second group can be determined more precisely.

In a further implementation form of the first aspect, masking an IRQ from the second group leads to a higher degradation of QoS of the second VM than masking an IRQ from the first group.

This ensures that the groups can be tailored to a desired amount of mitigation or a desired amount of QoS.

In a further implementation form of the first aspect, a magnitude of interference of the second VM with the first VM for all IRQs in the first group is below a predefined threshold, and/or a magnitude of interference of the second VM with the first VM for all IRQs in the second group is above a predefined threshold.

This ensures that groups of IRQs can be put together in a manner that increases the effectiveness of failure mitigation.

In a further implementation form of the first aspect, the interference parameter indicates at least one of: CPU interference, GPU interference, memory interference, I/O interference, cache-miss interference, network interference, storage interference, or bus interference.

This allows for determining various kinds of interference.

In a further implementation form of the first aspect, the first VM is the VM with a highest priority level operated by the hypervisor device.

This ensures that a failure of a VM with a highest ASIL level can be effectively mitigated.

A second aspect of the present disclosure provides a method for failure mitigation of a virtual machine (VM), where the method includes the steps of: operating, by a hypervisor device, a first VM; operating, by the hypervisor device, a second VM, where the first VM has a higher priority level than the second VM; determining, by the hypervisor device, an interference parameter indicating a magnitude of interference of the second VM on the first VM; and masking, by the hypervisor device, at least one interrupt request (IRQ) relating to the second VM based on the interference parameter to mitigate a failure of the first VM.

In an implementation form of the second aspect, the priority level includes a safety integrity level.

In a further implementation form of the second aspect, the method further includes determining, by the hypervisor device, the interference parameter based on a performance counter associated with the first VM and/or based on a performance counter associated with the second VM.

In a further implementation form of the second aspect, the method further includes obtaining, by the hypervisor device, a first relationship indicating an influence of a performance counter type and/or a performance counter value on the magnitude of interference of the second VM with the first VM; and determining the interference parameter based on the first relationship.

In a further implementation form of the second aspect, the method further includes obtaining, by the hypervisor device, a second relationship indicating the influence of an IRQ relating to the second VM on the magnitude of interference of the second VM with the first VM; and determine the interference parameter based on the second relationship.

In a further implementation form of the second aspect, the method further includes obtaining, by the hypervisor device, a first group of IRQs, and to select the at least one IRQ from the first group.

In a further implementation form of the second aspect, the method further includes obtaining, by the hypervisor device, the first group of IRQs based on the second relationship.

In a further implementation form of the second aspect, the method further includes obtaining, by the hypervisor device, a second group of IRQs, and to further select the at least one IRQ from the second group if an attempt to mitigate the failure of the first VM based on masking an IRQ from the first group fails.

In a further implementation form of the second aspect, the method further includes obtaining, by the hypervisor device, the second group of IRQs based on the second relationship.

In a further implementation form of the second aspect, masking an IRQ from the second group leads to a higher degradation of QoS of the second VM than masking an IRQ from the first group.

In a further implementation form of the second aspect, a magnitude of interference of the second VM with the first VM for all IRQs in the first group is below a predefined threshold, and/or a magnitude of interference of the second VM with the first VM for all IRQs in the second group is above a predefined threshold.

In a further implementation form of the second aspect, the interference parameter indicates at least one of: CPU interference, GPU interference, memory interference, I/O interference, cache-miss interference, network interference, storage interference, or bus interference.

In a further implementation form of the second aspect, the first VM is the VM with a highest priority level operated by the hypervisor device.

The second aspect and its implementation forms include the same advantages as the first aspect and its respective implementation forms.

A third aspect of the present disclosure provides a computer program including instructions which, when the computer program is executed by a computer, cause the computer to perform the method according to the second aspect or any of its implementation forms.

A fourth aspect of this disclosure provides a storage medium storing executable program code which, when executed by a processor, causes the method according to the second aspect or any of its implementation forms to be performed.

The present disclosure describes an innovative failure mitigation mechanism, used in MCSs running on top of an hypervisor e.g. for a micro-controller. The proposed mechanism aims at mitigating the effect of cascading failures when FFI cannot be completely prevented in systems where software components have a different ASIL. The present disclosure describes that interrupts assigned to workloads in VMs are classified according to the interference effect of such interrupts on the highest safety critical VM. Interruption of intermediate ASIL VMs (or not safety related ones) can be selectively deactivated in case the safety requirements of the most safety-critical workloads are going to be violated. This ensures mitigation of the overall interference on the most safety-critical VMs and leads to increased availability of intermediate-safety VMs even if with a reduction of their QoS.

The present disclosure increases availability of safety-related functionalities allocated on intermediate-ASIL VMs. Measurement of interference caused by every single IRQ on a high priority VM allows IRQs clustering, also referred to as "coloring," in the following description. Such operation allows the hypervisor device to gradually degrade the functionalities of intermediate priority VMs when it detects an interference in the high priority VM. The degradation of functionalities in the intermediate priority VM allows to preserve, for as long as possible, the safety-related functionalities and the execution of the high priority VM without interference.

It should be noted that all devices, elements, units and means described in the present disclosure could be implemented in the software or hardware elements or any kind of combination thereof. All steps which are performed by the various entities described in the present disclosure as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above-described aspects and implementation forms of the present disclosure will be explained in the following description of specific embodiments in relation to the enclosed drawings, in which:

FIG. 8 shows a schematic view of clustering according to an embodiment of the present disclosure;

DETAILED DESCRIPTION

Figure 1:
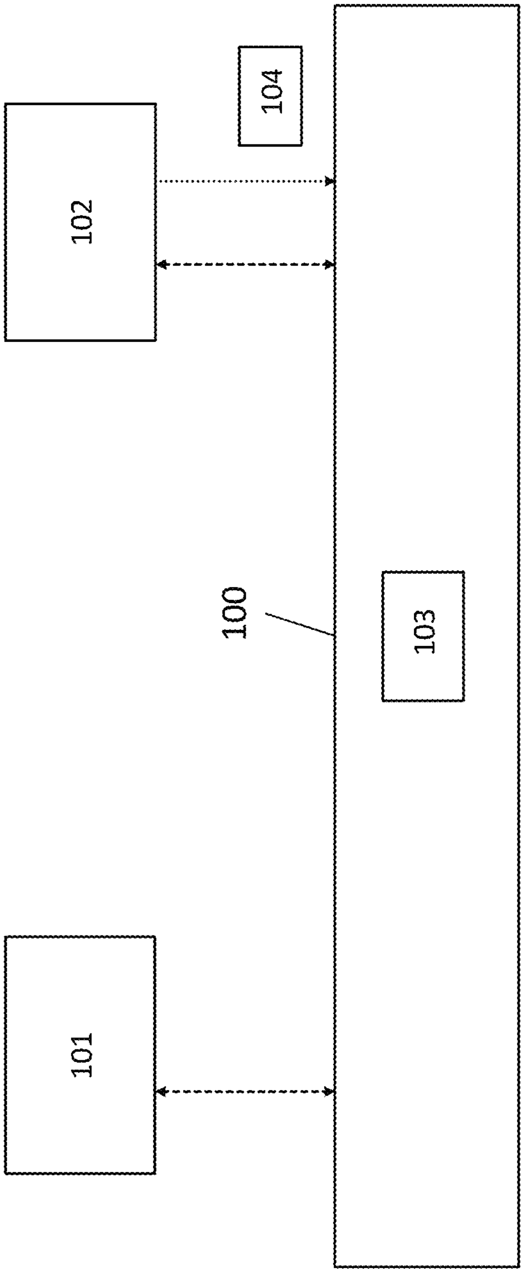
FIG. 1 shows a schematic view of a hypervisor device according to an embodiment of the present disclosure.

FIG. 1 shows a schematic view of a hypervisor device 100. The hypervisor device 100 is for failure mitigation of at least one VM 101. To this end, the hypervisor device 100 is configured to operate a first VM 101. The device 100 is also configured to operate a second VM 102. The first VM 101 has a higher priority level than the second VM 102. That is, the hypervisor device 100 can be used in a scenario where a VM 101 of higher priority can be protected from failure which is caused by lower priority VMs 102. Although there are only two VMs 101, 102 shown in FIG. 1, the hypervisor device 100 can also be used in scenarios where two or more VMs are present. To detect a failure, the hypervisor device 100 is configured to determine an interference parameter 103 indicating a magnitude of interference of the second VM 102 on the first VM 101.

A failure e.g., can be detected, if the interference parameter 103 exceeds a predefined threshold. To mitigate the failure, the hypervisor device 100 is configured to mask at least one interrupt request, IRQ, 104 relating to the second VM 102 based on the interference parameter 103.

By masking at least one IRQ 104 of the second VM 102, depending on the magnitude of interference of the second VM 102 on the first VM 101, the hypervisor device 100 allows for gradually mitigating the failure of the first VM 101 (caused by the interference of the second VM 102), without compromising the availability of the second VM 102.

In a possible implementation, the priority level can include a safety integrity level. The safety integrity level e.g., may include an automotive safety integrity level (ASIL).

In the below paragraphs the hypervisor device 100 will be described in more detail in view of FIG. 2. The hypervisor device 100 of FIG. 2 includes all functions and features of the wireless device 100 as described in view of FIG. 1.

The hypervisor device 100 allows for mitigating interference caused by lower priority or lower ASIL VMs 102 on higher priority or higher ASIL VMs 101, both running on a same hypervisor device 100 on the same hardware platform. Such mitigation can be performed by the underlying hypervisor device 100 exploiting the IRQs 104 of the lower priority VMs 102 as "knobs". That is, basically subsets of these interrupt lines are not handled during system execution, depending on the magnitude of the measured interference (e.g., the interference parameter 103). The sensors used for measuring such interference at runtime can be performance counters provided by the hardware platform.

Figure 2:
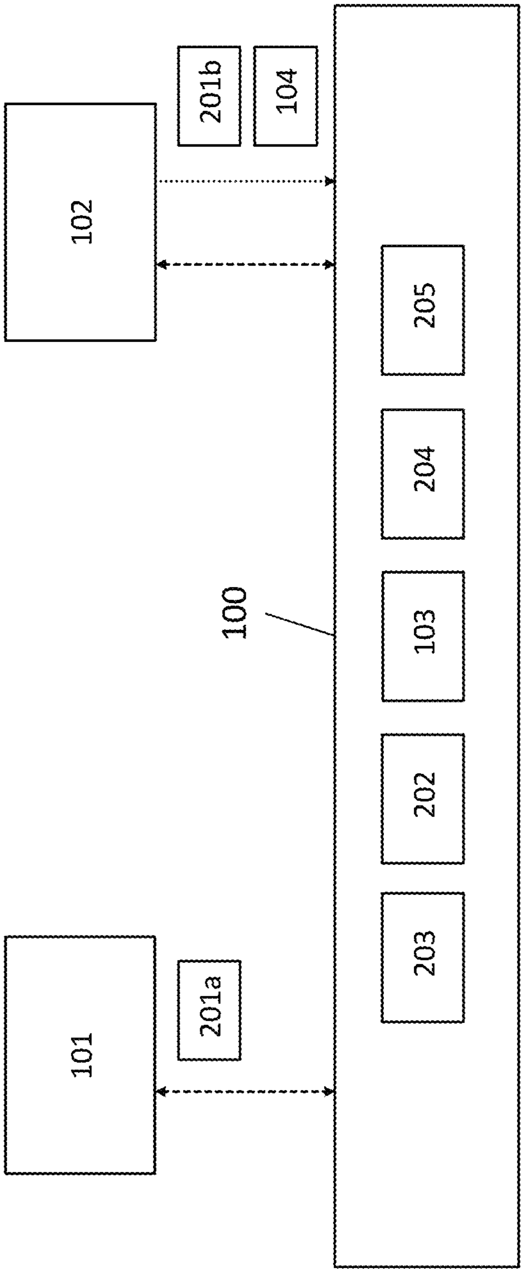
FIG. 2 shows a schematic view of a hypervisor device according to an embodiment of the present disclosure in more detail.

That is, as illustrated in FIG. 2, the hypervisor device 100 may determine the interference parameter 103 based on a performance counter 201*a* associated with the first VM 101. Additionally, or alternatively, the hypervisor device 100 may determine the interference parameter 103 based on a performance counter 201*b* associated with the second VM 102. That is, the interference parameter may reflect a present load situation of the VMs. In a possible implementation, the interference parameter 103 may be calculated based on a set of performance counters 201*b* or 201*a*.

Interference generally may depend on specific implementation and integration of the hypervisor device 100. Thus, every MCS which may take advantage from the hypervisor device 100 can be analyzed to identify a relationship between an interrupt served in the lower priority VM and the relative interference caused on the VM with higher or highest priority. According to these assumptions, the present disclosure may include two distinct phases: an offline phase and an online phase.

In the offline phase a system optionally can be analyzed under specific circumstances where inputs and outputs are controlled and monitored. A goal of the offline phase can be to produce outcomes which can be used by the hypervisor device 100 and can be prerequisites for the next phase.

One of these aspects can be identifying a formula which takes performance counter values as an input and produces a scalar value of a current interference. This may, in some examples, be achieved by observing only the highest priority VM executing with and without interference. Values of performance counters can then be correlated with the behavior of the safety functions carried out by the VM. Injected interferences can be controlled in terms of typology (memory, I/O etc.) and in terms of magnitude (low, medium, high). By analyzing the trend of performance counters values it is also possible to define stochastic precision and relevance of a specific counter in an overall interference calculation.

In other words, the hypervisor device 100 may further be configured to obtain a first relationship 202 indicating an influence of a performance counter type and/or a performance counter value on the magnitude of interference of the second VM 102 with the first VM 101 (that is, interference of the first VM 101 on the second VM 102); and determine the interference parameter 103 based on the first relationship 202. The first relationship 202 e.g., may include the formula which takes performance counter values as an input and/or the values of performance counters.

Another aspect can be to measure interference caused by a single IRQ handled in the lower priority VM to the higher or highest priority VM. In this scenario, both VMs are executed together but the lower priority VM has all the IRQs disabled except the one which is under measurement. The entity of the interference caused by the specific IRQ e.g., can be calculated using the formula derived in the previous step. The interrupt's weight can then be adjusted by using a "bias" which may depend on the functionality associated with the IRQ and its relevance for the implementation of the safety related function(s) running of the VM.

In other words, the hypervisor device 100 may further obtain a second relationship 203 indicating the influence of an IRQ 104 relating to the second VM 102 on the magnitude of interference of the second VM 102 with the first VM 101; and determine the interference parameter 103 based on the second relationship 203. That is, the second relationship specifically may include the interference caused by a single IRQ and/or the bias.

Another aspect can be the clustering of IRQs. According to this aspect, interrupts can basically be divided into subsets a.k.a. "colors" depending on the effects measured in the previous step. The clustering algorithm, the number, and/or dimension of the clusters can be chosen arbitrarily. Clustering also allows for an identification of the thresholds of interference which separate a "color" from the next one.

In other words, the hypervisor device 100 may obtain a first group of IRQs 204, and select the at least one IRQ 104 from the first group 204. In a possible implementation, the first group of IRQs 204 can comprise one of the clusters described above.

More specifically, the first group of IRQs 204 can be determined based on the second relationship 203. That is, the first group 204 (i.e., the clusters) can be determined based on the interference caused by a single IRQ on one of the VMs 101, 102.

All the colors and the IRQs which compose them can be collected and described in a configuration which can be provided to the hypervisor device 100. Such a configuration can be used e.g., during the online phase. The hypervisor device 100 may sample values from performance counters and it will calculate the current interference on the highest priority VM e.g., by using the formula derived in the offline phase. Depending on the magnitude of the interference, a so called "degraded mode" can be applied to the lower priority VM by disabling a specific "color" of interrupts according to the provided configuration. Such an algorithm can be carried out by the hypervisor device in the online phase.

In other words, the hypervisor device may obtain a second group of IRQs 205, and further select the at least one IRQ 104 from the second group 205, if an attempt to mitigate the failure of the first VM 101 based on masking an IRQ from the first group 204 fails. The second group 205 may include one of the other clusters or colors of IRQs. Also the second group 205 (i.e., the clusters or colors) can be determined based on the interference caused by a single IRQ on one of the VMs 101, 102 (that is, based on the second relationship 203).

The clustering or coloring of the IRQs can be done in an order, according to which masking an IRQ from the second group 205 leads to a higher degradation of quality of service, QoS, of the second VM 102 than masking an IRQ from the first group 204. In other words, the second VM 102 may be degraded stepwise to ensure that the first VM 101 has enough resources without immediately switching of the second VM 102 at once.

In a possible implementation, a magnitude of interference of the second VM 102 with the first VM 101 can be below a predefined threshold for all IRQs in the first group 204. In other words, the IRQs in the first group cause less interference on the first VM, but at the same time do not influence the behaviour of the second VM 102 that much when being masked.

In a possible implementation, a magnitude of interference of the second VM 102 with the first VM 101 can be above a predefined threshold for all IRQs in the second group 205. In other words, the IRQs in the second group cause more interference on the first VM 101, but also do influence the behaviour of the second VM 102 more when being masked.

According to the following disclosure, the hypervisor device 100 can be responsible for managing the IRQs by forwarding them to a corresponding VM. For notation simplification, each IRQ propagated to a given VM is identified by a unique index below. It follows that the IRQ index (i.e., $IRQ_k$) corresponds to the tuple composed of the physical PIN associated with the interrupt and the identifier of the VM that manages such interrupt. Thus, in case the same physical interrupt is forwarded to n VMs, it is referred as n different indexes. As for index notation in the following part of the disclosure, the target VM with the highest priority (or ASIL) can be referred to as the target VM with index i (i.e., $VM_i$).

$P_{j_{VMi}}$ can be defined as the j-th parameter that influences the $VM_i$ behavior from a safety point of view.

Interference parameters 103 are typically memory interference, I/O interference, cache-miss interference and so forth. At each instance, the values of parameters $P_{j_{VMi}}$ indicate the current status of the target VM $VM_i$. In other words, the interference parameter 103 can indicate at least one of: CPU interference, GPU interference, memory interference, I/O interference, cache-miss interference, network interference, storage interference, or bus interference.

The interference parameter 103 can be used to define the interference effect of the target VM, referred to as $e_{VMi}$. As shown in formula 1 below, such effect is calculated by combining the interferences that affect the target VM and each interference is due to the corresponding interference parameter:

$$e_{VMi} = f_i\left(I_{0_{VMi}}(\hat{P}_{0_{VMi}}), I_{1_{VMi}}(\hat{P}_{1_{VMi}}), I_{2_{VMi}}(\hat{P}_{2_{VMi}}), \ldots, I_{N_{VMi}}(\hat{P}_{N_{VMi}})\right)$$

In this equation, $\hat{P}_{j_{VMi}}$ is the value of the j-th parameter that influences the i-th VM; $I_{j_{VMi}}(.)$ is the function that calculates the interference caused by the j-th parameter on the i-th VM; and $f_i(.)$ is the function that combines the different type of interferences that affect the i-th VM.

$p_{j_{k,i}}$ can be defined as the interference due to the k-th IRQ (i.e., $IRQ_k$) on the j-th parameter of a target VM $VM_i$. The overall interference of the k-th IRQ on the target VM $VM_i$ can be defined as follows:

$$\overrightarrow{PMU}(IRQ_k, VM_i) = \left[p_{0_{k,i}}, p_{1_{k,i}}, p_{2_{k,i}}, \ldots, p_{N_{k,i}}\right]$$

Figure 3:
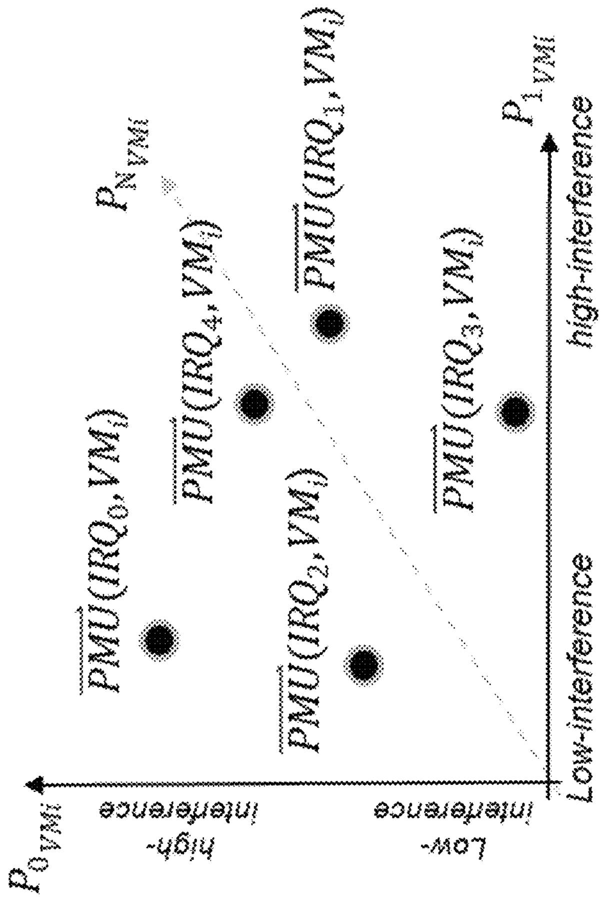
FIG. 3 shows a schematic view of mapping IRQ interference into an N-dimensional space of target VM interference parameters according to an embodiment of the present disclosure.

FIG. 3, e.g., shows a mapping of the interference of a k-th IRQ within the N-dimensional space describing the interference of the target VM. In the N-dimensional space, each axis corresponds to an interference parameter. Lower values on the j-th axis imply a low-interference, whereas higher values on the j-th axis imply a high-interference on the target VM.

The IRQ interference parameters $p_{j_{k,i}}$ can be used to define the interference effect of the IRQ $IRQ_k$ on a target VM $VM_i$. As shown in formula 2 below, such effect is calculated by combining the interferences that affect the target VM, while each interference is due to the corresponding IRQ interference parameter.

$$e(IRQ_k, VM_i) = f_i\left(I_{0_{VMi}}(p_{0_{k,i}}), I_{1_{VMi}}(p_{1_{k,i}}), I_{2_{VMi}}(p_{2_{k,i}}), \ldots, I_{N_{VMi}}(p_{N_{k,i}})\right) - \text{BIAS}(IRQ_k)$$

In the above formula, $p_{j_{k,i}}$ is the value of the j-th interference parameter due to k-th IRQ that influences the i-th VM; $I_{j_{VMi}}(.)$ and $f_i(.)$ are the same functions used for the interference effect on the i-th VM shown in formula 1; and $\text{BIAS}(IRQ_k)$ is a constant value defined according to the IRQ logical and safety-related functionalities of the VM receiving the interrupt (i.e., timers on VM have highest BIAS).

Figure 4:
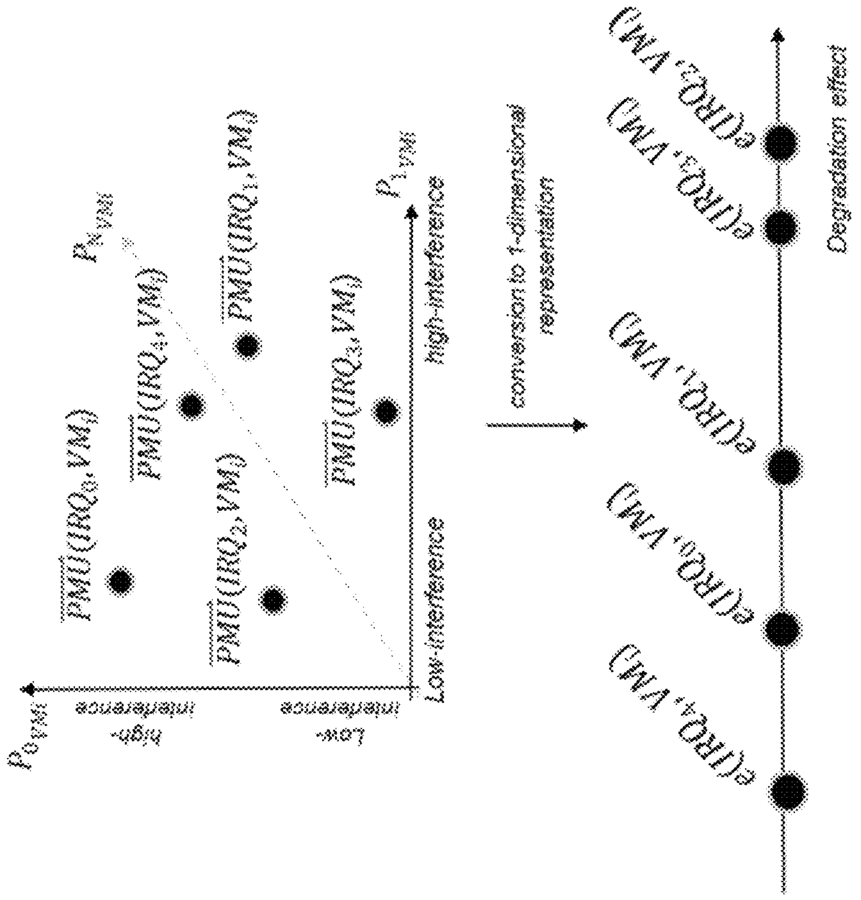
FIG. 4 shows a schematic view of an IRQ interference effect according to an embodiment of the present disclosure.

FIG. 4 shows how the IRQ interference, mapped into the N-dimensional space describing the interference of the target VM, can be reduced to a one-dimensional space. In the resulting one-dimensional space, lower values of the IRQ interference effect imply a low degradation effect on the target VM, whereas higher values imply a high degradation effect.

The algorithm can be divided into two parts: an OFFLINE phase and an ONLINE phase.

As for the OFFLINE phase, the algorithm may include the following steps:

1. For each IRQ, the IRQ interference effect $e(IRQ_k, VM_i)$ on the target VM is calculated:
   a. The function $I_{j_{VMi}}(.)$ that calculates the interference caused by the j-th parameter on the target VM $VM_i$ is defined.
   b. The function $f_i(.)$ that combines the different type of interferences that affect the target VM $VM_i$ is defined.
   c. The value of BIAS ($IRQ_k$) that is defined according to the IRQ logical and safety-related functionalities of the VM receiving the interrupt (i.e., timers on VM have highest BIAS) are defined.
   d. The interference $p_{j_{k,i}}$ due to the k-th IRQ (i.e., $IRQ_k$) on the j-th parameter of the target VM $VM_i$ is defined.
2. Clusters and related centroids/thresholds are defined.
3. A "color" is associated to each cluster. Each color is associated with a progressive value in the degradation effect scale.
4. For each IRQ the "coloring" mechanism is applied. That is, the color is assigned to a given IRQ if the cluster associated with the color contains the IRQ interference effect $e(IRQ_k, VM_i)$.

Figure 5:
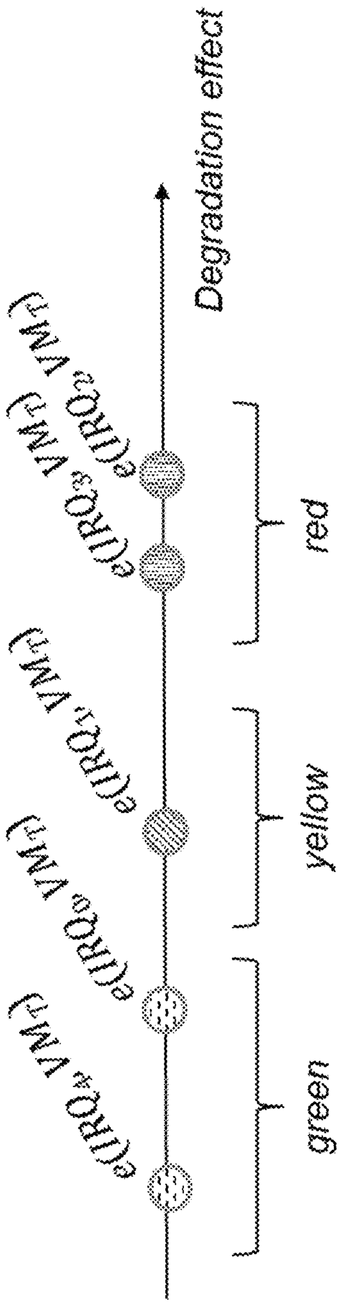
FIG. 5 shows a schematic view of an IRQ coloring mechanism according to an embodiment of the present disclosure.

The result is also illustrated in FIG. 5, which shows different colors that are associated to IRQs, respectively an IRQ interference effect.

As for the ONLINE phase, the proposed algorithm may include the following steps:

1. At run-time, the hypervisor device 100 monitors the VM behavior and the behavior of the target VM $VM_i$ (i.e., the first VM 101).
2. In case that the hypervisor device 100 detects a degradation in the target VM 101 (e.g., some monitored parameters highlight interference by exceeding the offline pre-computed values), the hypervisor device 100 switches to a degraded state:
   a. The hypervisor device 100 masks the IRQs 104 belonging to the cluster with the highest degradation effect. With reference to FIG. 5, it masks all the "green" IRQs (i.e., the IRQs from the first group 204).
   b. In case the monitored parameters of the target VM 101 are still showing interference, the hypervisor device 100 continues progressively to mask the IRQs associated with lowest degradation effect. With reference to FIG. 5, the hypervisor masks the "yellow" and then "red" IRQs (i.e., the IRQs from the second group 205).
   c. In case that the hypervisor device 100 restores the status of the target VM, it progressively unmasks the IRQs starting from the color associated with lower degradation effect. That is, the IRQs are restored in the inverse order with respect to the previous points.

With reference to the OFFLINE phase, in step 1 the definition of functions and parameters used to calculate the IRQ interference effect $e(IRQ_k, VM_i)$ on the target VM hinges on the interference detection on the target VM, performed by performance counters 201*a*, 201*b*.

Figure 6:
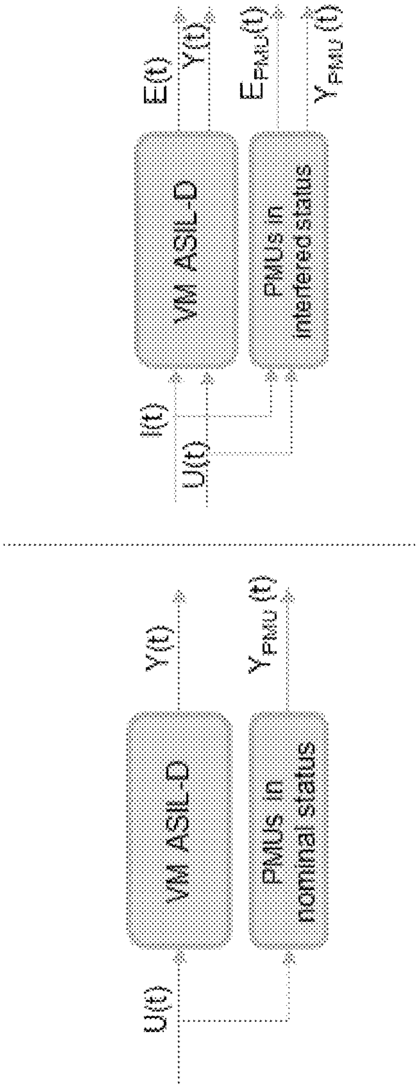
FIG. 6 shows a schematic view of usage of performance counters to detect interference according to an embodiment of the present disclosure.

As it is also illustrated in FIG. 6, the performance counters 201*a*, 201*b* can be used to detect interference by estimating the deviation from the values measured under nominal circumstances, that is: no interference; span all the input U(t) space; the output Y(t) is the expected one.

The Performance counters 201*a*, 201*b* may maintain bounded values $Y_{PMU}(t)$. By analyzing the behavior of these values, it is also possible to establish a suitable stochastic distribution (mean, variance etc.) and then derive the counters precision. Then, interferences can be added to the system and an error E(t) is detectable in the output. Thus, performance counters shall reflect the error's magnitude and dynamics $E_{PMU}(t)$. A heuristic can be defined to estimate the error at a certain time from the values of the performance counters. Interferences I(t) can be divided into different functional sets by classes (memory interference, IO interference) and by magnitude (low, high, intermediate).

Figure 7:
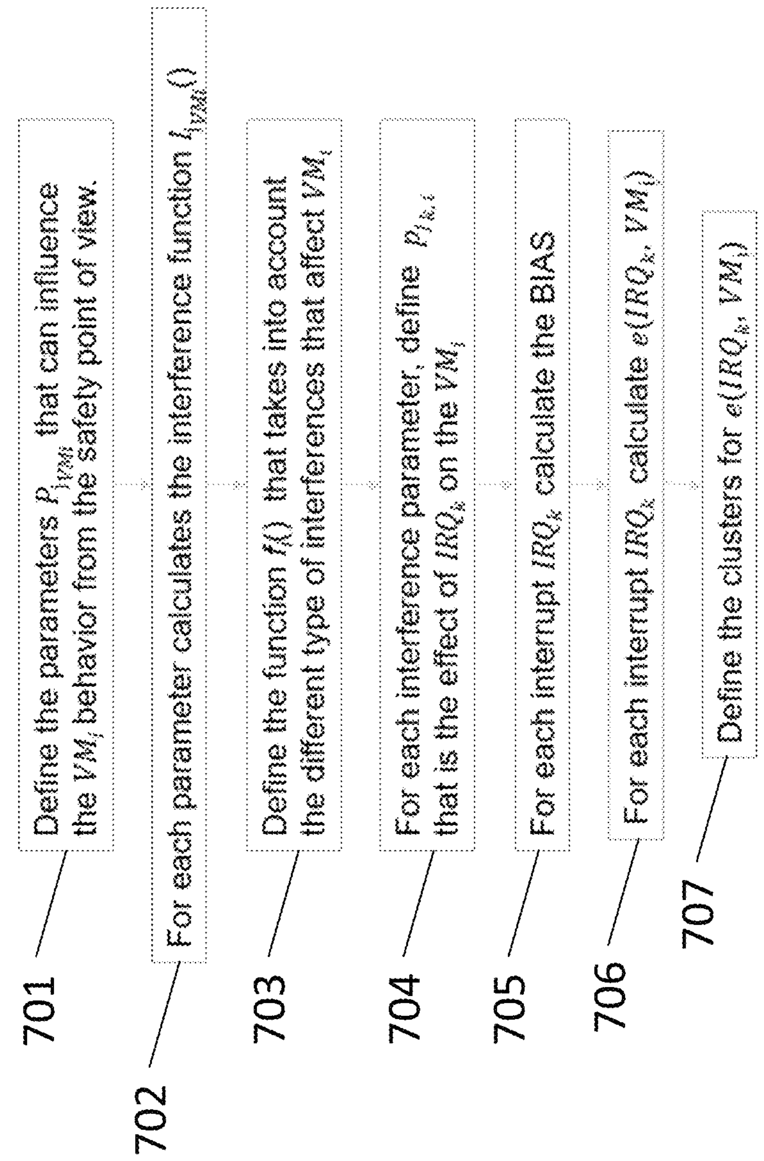
FIG. 7 shows a schematic view of an offline phase according to an embodiment of the present disclosure.

According to an exemplary embodiment of the present disclosure which is described in view of FIG. 7, for the OFFLINE phase, the proposed algorithm includes the following steps:

Step 701: parameters $P_{j_{VMi}}$ are defined that can influence the $VM_i$ behavior of the safety-related intended functionality. Interference parameters are typically memory interference, I/O interference, cache-miss interference and so forth.

Step 702: For each parameter the interference function $I_{j_{VMi}}(.)$ that defines the interference caused by the j-th parameter on the target VM $VM_i$ is calculated.

a. Execute the target VM $VM_i$ in the nominal state (without interference). The evaluated values of performance counters on $VM_i$ are set as reference values.
b. Execute the target VM $VM_i$ with a progressive interference and evaluate the deviation between the values measured by the performance counter on $VM_i$ and the reference values.
c. Calculate the interference function $I_{j_{VMi}}(.)$ as the interpolation function of the deviation of the measured values of performance counters.

Step 703: The function $f_i(.)$ is defined that combines the different types of interferences potentially affecting the $VM_i$. The function is typically a weighted sum where the weight depends on the impact of the corresponding parameter on the safety related intended functionalities on the target VM.

Step 704: For each interference parameter, the effect $p_{j_{k,i}}$ of, $IRQ_k$ on $VM_i$ is defined.

a. Execute the target $VM_i$ and the VM that is associated with the interrupt $IRQ_k$.
b. Mask the interrupt $IRQ_k$. The evaluated values of performance counters on $VM_i$ are set as reference values.
c. Unmask the interrupt $IRQ_k$. The deviation of the values, measured by the performance counters, with respect to the reference value corresponds to $p_{j_{k,i}}$ Step 705: For each interrupt $IRQ_k$, the $BIAS(IRQ_k)$ is calculated. Such value is defined according to the IRQ logical and safety-related functionality of $IRQ_k$ in the VM receiving the interrupt (i.e., timers on VM have highest BIAS).

Step 706: For each interrupt $IRQ_k$, $e(IRQ_k, VM_i)$ is calculated. Apply the formula shown in formula 2 using the interference function $I_{j_{VMi}}(.)$ defined in step 702, the function $f_i(.)$ defined in step 703, the value of $p_{j_{k,i}}$ defined in step 704 and the BIAS defined in step 705.

Step 707: The clusters for $e(IRQ_k, VM_i)$ are defined.

a. Define the cluster number and associate a cluster to a "color" as a cluster identifier.
b. For each cluster define the cluster bounds so that clusters do not overlap
c. Associated the interrupt $IRQ_k$ to a cluster if the value of $e(IRQ_k, VM_i)$ is contained within the cluster bounds.

The result is the association of the interrupt within a cluster (or "color"). Notice that colors are ordered in terms of degradation effect. A color associated with a cluster, whose bounds values refers are lower, refers to a lower degradation effect on the target VM.

FIG. 8 shows an example of IRQ "coloring". On the left hand side, classes of IRQs are shown, while on the right hand side an example configuration file of degraded states and corresponding IRQs which are disabled or enabled, are shown.

As for the ONLINE phase, the hypervisor device 100 can monitor the behavior of the target $VM_i$ 101 via performance counters. In case the hypervisor device 100 detects an interference in the target VM 101, because the monitored parameters are moving outside pre-computed acceptable values, it masks the IRQs 104 belonging to the cluster 204 with the highest degradation effect. In case the monitored parameters of the target VM 101 are still showing interference, the hypervisor continues progressively to mask the IRQs associated with lower degradation effect 205. In case the hypervisor has to restore the status of the target VM 101, it progressively unmasks the IRQ starting from the color associated with lower degradation effect. That is, the IRQs can be restored in the inverse order with respect to the masking order.

In the above described scenario, the VMs 101, 102 composing the MCS are seen as "black boxes", since they are taken "as is" and integrated on the same hardware platform without any modification. An alternative solution for interference detection can be VM introspection by monitoring specific parameters that can be treated like a state space of a dynamic system. A "white box" approach can be adopted where code and VM internals are reachable by the hypervisor device 100 and can be monitored at run-time. The hypervisor device 100 can access specific memory location inside a VM's private memory space, allocating more memory itself (e.g. memory pages table), which may require code availability.

The hypervisor device 100 may be used in application domains where safety, integrity and availability must be guaranteed (e.g. automotive, avionics, railways, robotics and medical). Within such domains, the hypervisor device 100 can be applied in a hypervisor-based environment where different ASIL level functionalities are confined in their own VMs. VMs could interfere among each other e.g., due to a high I/O-based workload.

Figure 9:
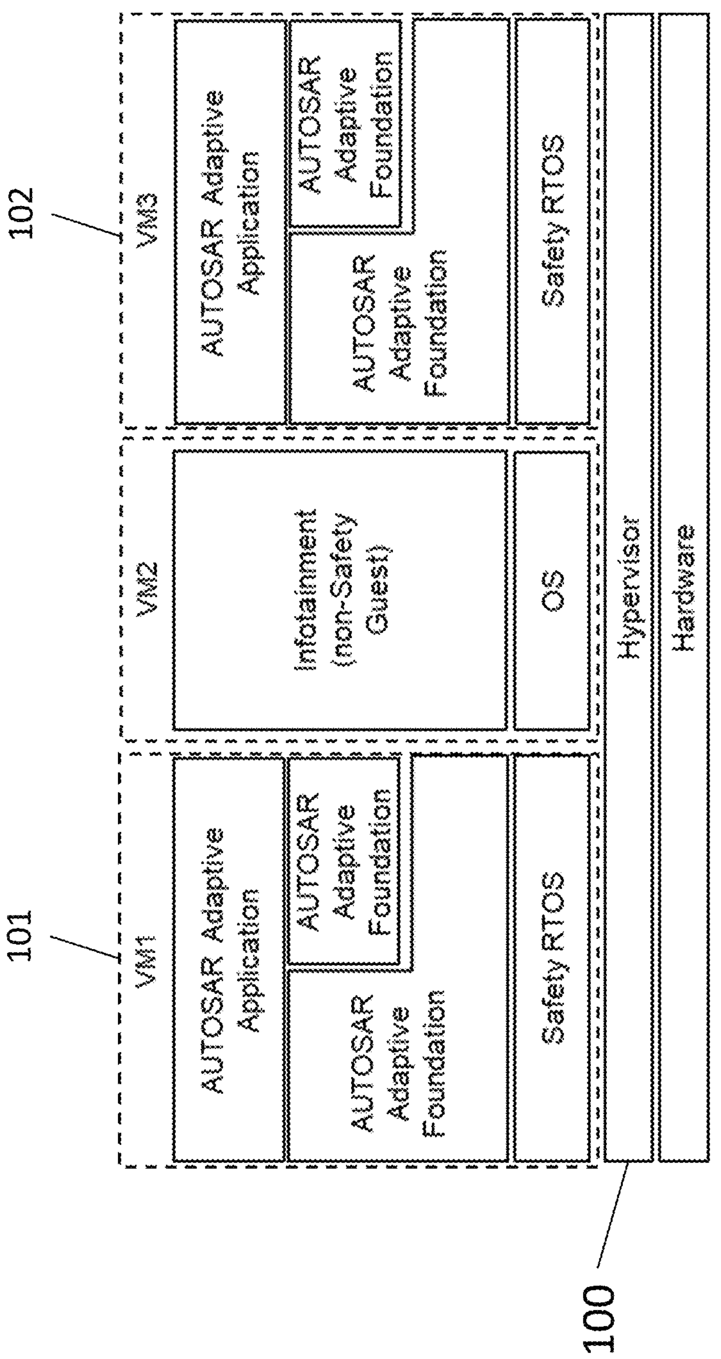
FIG. 9 shows a schematic view of an automotive application scenario according to an embodiment of the present disclosure.

With reference to the automotive field, the hypervisor device 100 can be used to mitigate the effect of cascading failures causing the violation of timing constraints in an Automotive Open System architecture (AUTOSAR) adaptive virtualized system, as the one shown in FIG. 9. As shown in this figure, the implementation of automotive software in modern cars is a set of VM guests in a hypervisor-based environment. High ASIL VMs (e.g. digital cockpit, telltale display, ADAS system) and quality management (QM) software (e.g. infotainment) run on the same platform. In an exemplary scenario assume that $VM_1$ (i.e. the first VM 101) with the highest ASIL (i.e., ASIL-D) and $VM_3$ (i.e. the second VM 102) with the intermediate ASIL (i.e. ASIL-B) run on the same SOC but on different set of cores. Furthermore, $VM_3$ workload is mostly based on I/O operations. In such a scenario, $VM_1$ might experiment interferences because of IRQ-handlers and processing task of the $VM_3$ having excessive usage of common resources (e.g., bus, caches), or because there are excessive activations of IRQ-handlers and processing tasks caused by external peripherals (e.g., the CAN bus). The interference experimented by $VM_1$ may affect the temporal constraints of the tasks running on $VM_1$.

Figure 10:
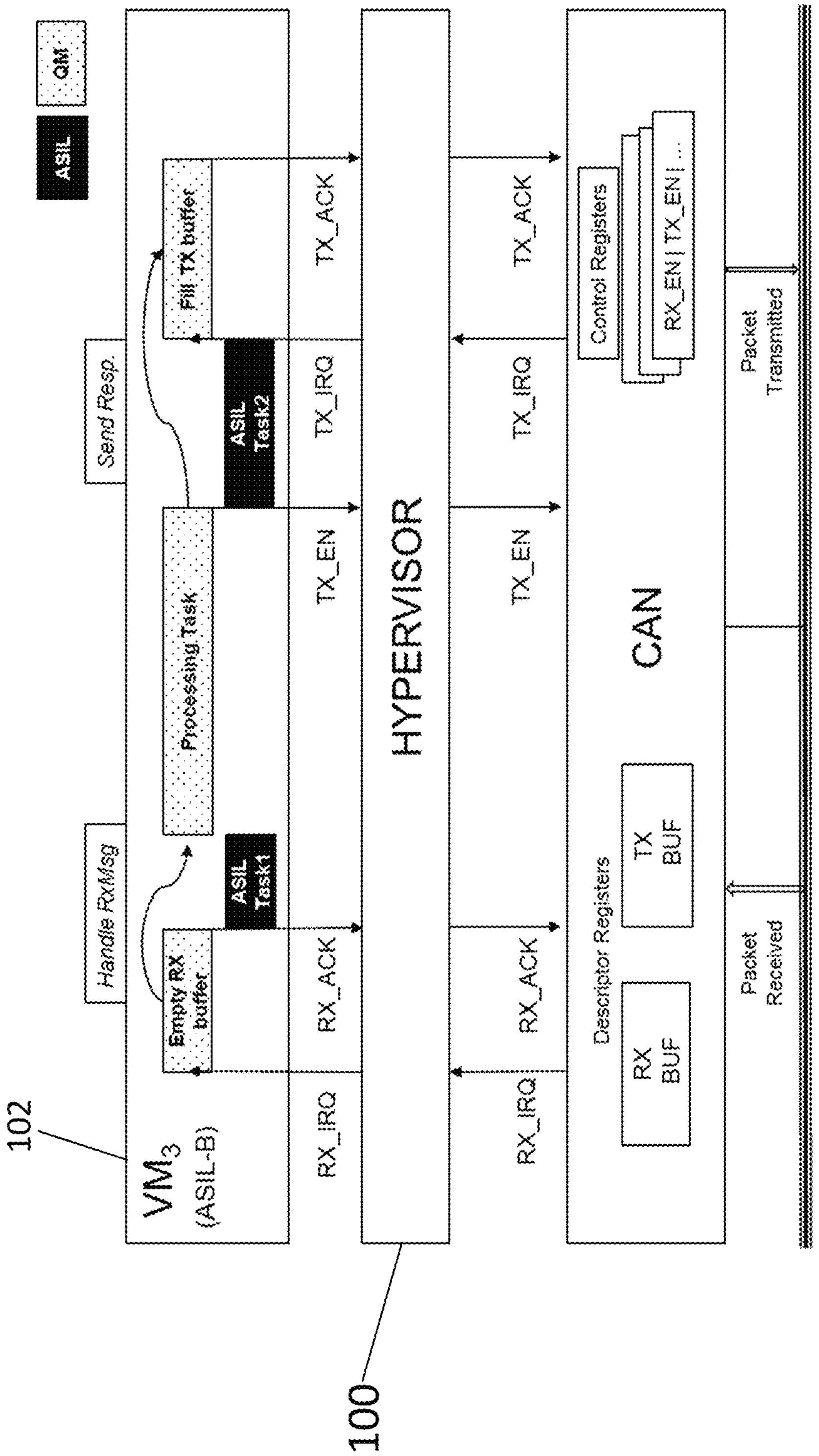
FIG. 10 shows a schematic view of a Controller Area Network (CAN) use case according to an embodiment of the present disclosure.

In the above example, $VM_3$ workload is composed by ASIL tasks and a task, referred to as processing task, which is responsible for managing CAN messages. The processing task is activated every time a message is received from the CAN bus as shown in FIG. 10. In case the $VM_3$ causes interference on the highest-ASIL VM, the features of the present disclosure aim at mitigating its effects by moving the $VM_3$ from the consolidate system into a degraded mode state (i.e., with the CAN interrupts disabled) as shown in FIG. 11.

Figure 11:
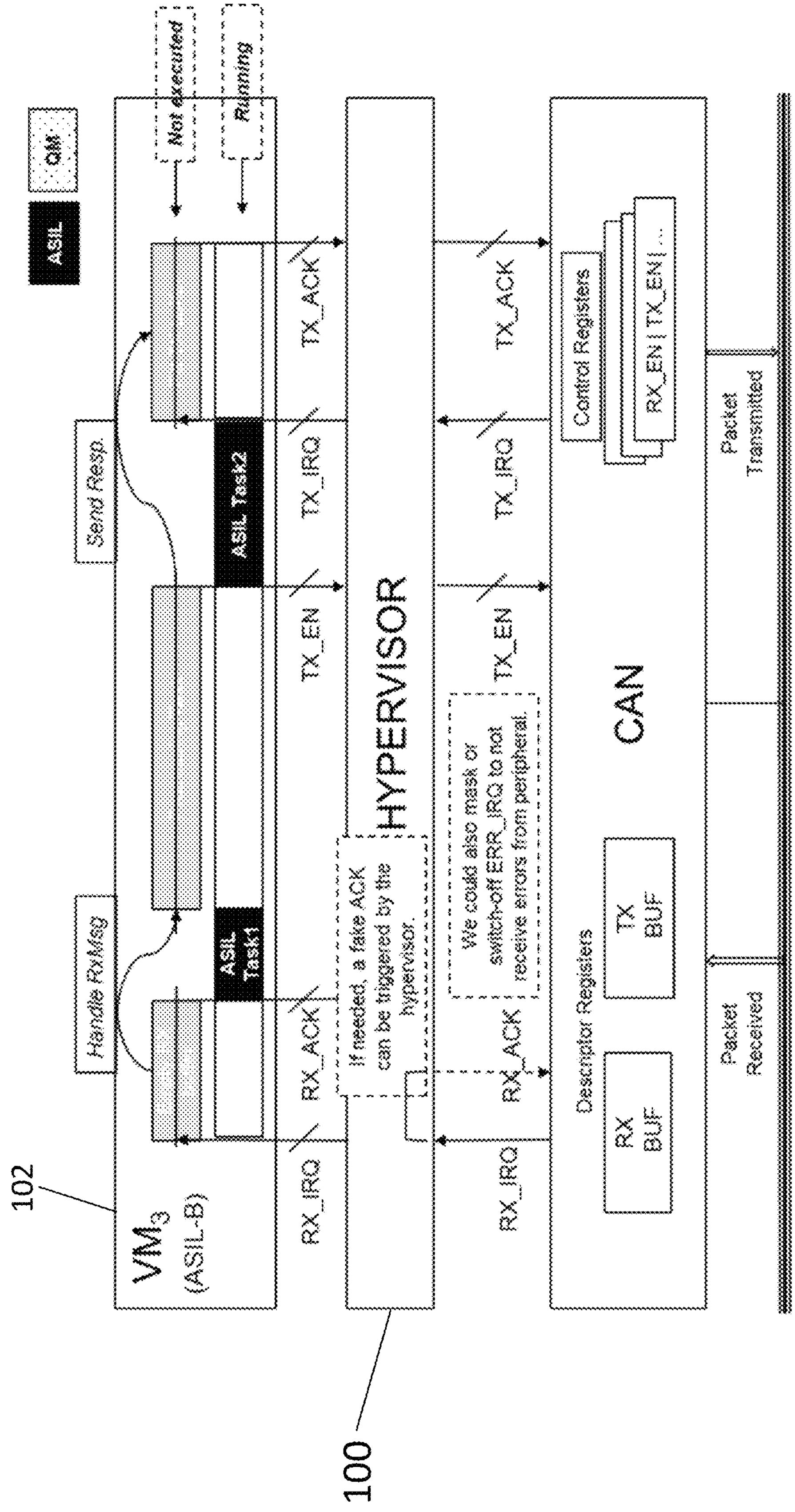
FIG. 11 shows another schematic view of a CAN use case according to an embodiment of the present disclosure.

As shown in FIG. 11 referred to the degraded mode state, the RX_IRQ interrupt is not propagated to the $VM_3$ and the idle task substitutes the processing task. Since the idle task does not produce interference (i.e., no usage of common resources) $VM_1$ is no more influenced by further interference and runs at its nominal operation condition. On the other hand, $VM_3$ runs in degraded mode with some features disabled, as the task associated with the CAN bus, but it preserves the functionalities associated with its ASIL tasks.

Figure 12:
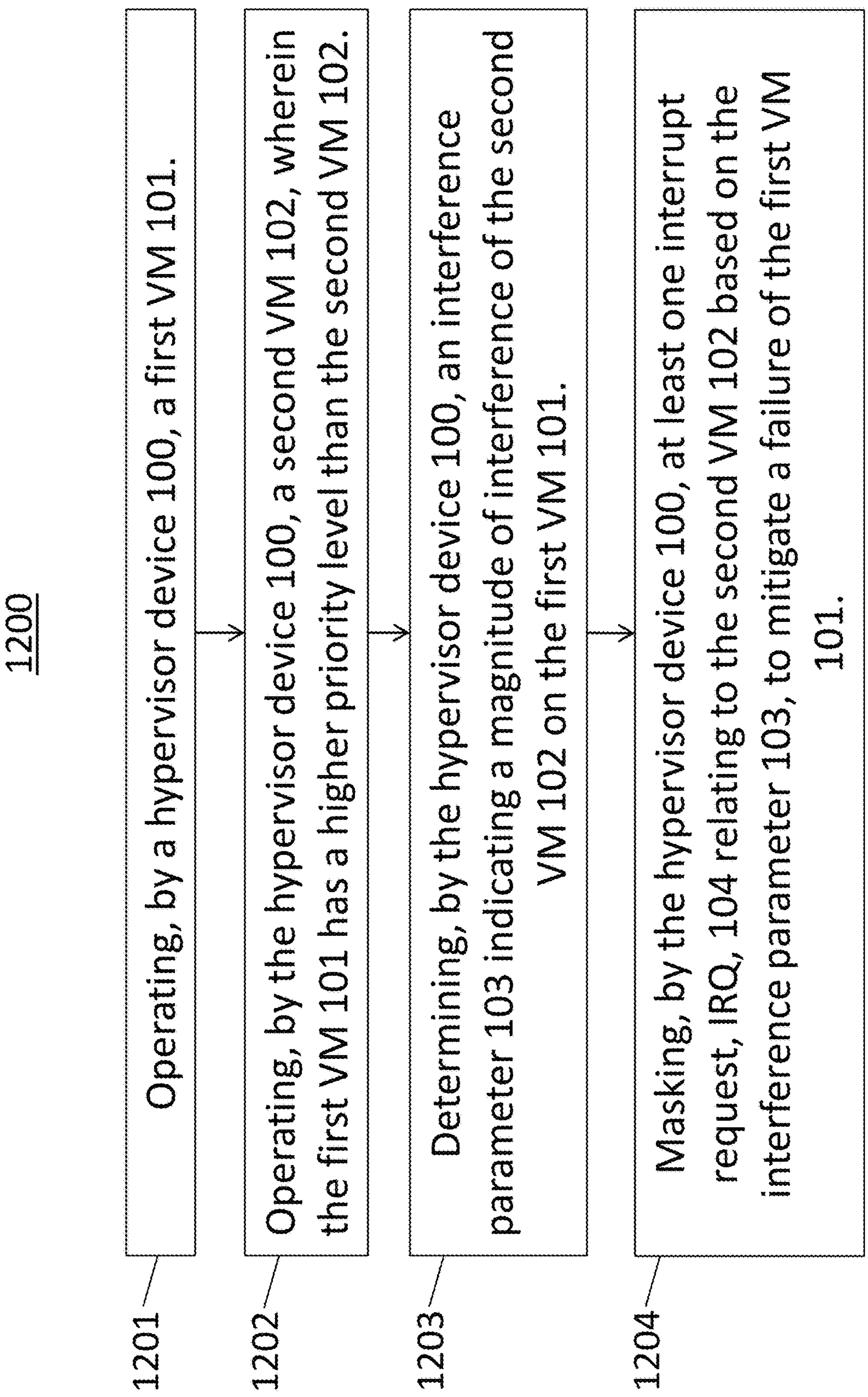
FIG. 12 shows a schematic view of a method according to an embodiment of the present disclosure.

FIG. 12 shows a schematic view of a method 1200. The method 1200 is for failure mitigation of a VM 101 and includes the steps of: operating 1201, by a hypervisor device 100, a first VM 101; operating 1202, by the hypervisor device 100, a second VM 102, where the first VM 101 has a higher priority level than the second VM 102; determining 1203, by the hypervisor device 100, an interference parameter 103 indicating a magnitude of interference of the second VM 102 on the first VM 101; and masking 1204, by the hypervisor device 100, at least one IRQ 104 relating to the second VM 102 based on the interference parameter 103 to mitigate a failure of the first VM 101.

The present disclosure has been described in conjunction with various embodiments as examples as well as implementations. However, other variations can be understood and effected by those persons skilled in the art and practicing the claimed disclosure, from the studies of the drawings, this disclosure, and the independent claims. In the claims as well as in the description, the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A hypervisor device for failure mitigation of a virtual machine (VM), the hypervisor device comprising a processor, wherein the hypervisor device is configured to:
- operate a first VM;
- operate a second VM, wherein the first VM has a higher priority level than the second VM;
- determine an interference parameter indicating a magnitude of interference of the second VM on the first VM, the determining of the interference parameter being based on a performance counter associated with the first VM and/or based on a performance counter associated with the second VM; and
- mask at least one interrupt request (IRQ) relating to the second VM based on the interference parameter to mitigate a failure of the first VM.

2. The hypervisor device according to claim 1, wherein the priority level comprises a safety integrity level.

3. The hypervisor device according to claim 1, further configured to:
- obtain a first relationship indicating an influence of a performance counter type and/or a performance counter value on the magnitude of interference of the second VM with the first VM; and
- determine the interference parameter based on the first relationship.

4. The hypervisor device according to claim 1, further configured to:
- obtain a second relationship indicating an influence of the at least one IRQ relating to the second VM on the magnitude of interference of the second VM with the first VM; and
- determine the interference parameter based on the second relationship.

5. The hypervisor device according to claim 4, further configured to:
- obtain a first group of IRQs; and
- select the at least one IRQ from the first group of IRQs.

6. The hypervisor device according to claim 5, further configured to obtain the first group of IRQs based on the second relationship.

7. The hypervisor device according to claim 5, further configured to:
- obtain a second group of IRQs; and
- select the at least one IRQ from the second group of IRQs if an attempt to mitigate the failure of the first VM based on masking an IRQ from the first group of IRQs fails.

8. The hypervisor device according to claim 7, further configured to obtain the second group of IRQs based on the second relationship.

9. The hypervisor device according to claim 7, wherein masking an IRQ from the second group of IRQs leads to a higher degradation of quality of service (QoS) of the second VM than masking the IRQ from the first group of IRQs.

10. The hypervisor device according to claim 7, wherein the magnitude of interference of the second VM with the first VM for all IRQs in the first group of IRQs is below a predefined threshold, and/or wherein the magnitude of interference of the second VM with the first VM for all IRQs in the second group of IRQs is above a predefined threshold.

11. The hypervisor device according to claim 1, wherein the interference parameter indicates at least one of: central processing unit (CPU) interference, Graphics Processing Unit (GPU) interference, memory interference, input/output (I/O) interference, cache-miss interference, network interference, storage interference, or bus interference.

12. The hypervisor device according to claim 1, wherein the first VM is the VM with a highest priority level operated by the hypervisor device.

13. A method for failure mitigation of a virtual machine (VM), wherein the method comprises the steps of:
- operating, by a hypervisor device, a first VM;
- operating, by the hypervisor device, a second VM, wherein the first VM has a higher priority level than the second VM;
- determining, by the hypervisor device, an interference parameter indicating a magnitude of interference of the second VM on the first VM, the determining of the interference parameter being based on a performance counter associated with the first VM and/or based on a performance counter associated with the second VM; and masking, by the hypervisor device, at least one interrupt request (IRQ) relating to the second VM based on the interference parameter to mitigate a failure of the first VM.

14. A non-transitory computer readable storage medium comprising a computer program comprising instructions which, when the computer program is executed by a computer, cause the computer to perform a method for failure mitigation of a virtual machine (VM), the method comprising:

operating a first VM;

operating a second VM, wherein the first VM has a higher priority level than the second VM;

determining an interference parameter indicating a magnitude of interference of the second VM on the first VM, the determining of the interference parameter being based on a performance counter associated with the first VM and/or based on a performance counter associated with the second VM; and masking at least one interrupt request (IRQ) relating to the second VM based on the interference parameter to mitigate a failure of the first VM.

* * * * *